US006877768B2

(12) United States Patent
Fujiwara (10) Patent No.: US 6,877,768 B2
(45) Date of Patent: Apr. 12, 2005

(54) CUSHION FOR PROTECTION OF A VEHICLE OCCUPANT'S HEAD

(75) Inventor: Tsuyoshi Fujiwara, Shiga (JP)

(73) Assignee: Takata Corporation, Tokyo (JP)

( * ) Notice: Subject to any disclaimer, the term of this patent is extended or adjusted under 35 U.S.C. 154(b) by 35 days.

(21) Appl. No.: 10/064,919

(22) Filed: Aug. 29, 2002

(65) Prior Publication Data

US 2003/0042716 A1 Mar. 6, 2003

(30) Foreign Application Priority Data

Aug. 30, 2001 (JP) ........................................ 2001-261706

(51) Int. Cl.⁷ .............................................. B60R 21/22
(52) U.S. Cl. ................................. 280/730.2; 280/743.1
(58) Field of Search .............................. 280/729, 730.2, 280/743.1

(56) References Cited

U.S. PATENT DOCUMENTS

| 3,814,458 | A | | 6/1974 | Acs |
| 5,240,283 | A | * | 8/1993 | Kishi et al. ................. 280/729 |
| 5,707,711 | A | * | 1/1998 | Kitamura .................... 428/193 |
| 5,782,489 | A | | 7/1998 | LaLonde et al. |
| 5,797,621 | A | * | 8/1998 | Ono ......................... 280/730.2 |
| 6,220,629 | B1 | | 4/2001 | Wipasuramonton et al. |
| 6,264,234 | B1 | * | 7/2001 | Hill et al. ................. 280/730.2 |
| 6,458,724 | B1 | * | 10/2002 | Veiga et al. .................. 442/76 |
| 6,502,853 | B2 | * | 1/2003 | Keshavaraj ................. 280/729 |
| 6,517,110 | B1 | * | 2/2003 | Butters et al. .............. 280/749 |

FOREIGN PATENT DOCUMENTS

| EP | 0 962 363 A1 | 12/1999 |
| GB | 2 343 868 A | 5/2000 |
| JP | 11-310097 A | 11/1999 |
| WO | WO 02/055347 A1 | 7/2002 |

* cited by examiner

Primary Examiner—David R. Dunn
(74) Attorney, Agent, or Firm—Foley & Lardner LLP

(57) ABSTRACT

A cushion for protecting a vehicle occupant's head. The cushion inflates and deploys smoothly and is configured so that gas leakage out of the cushion is reduced in order to maintain the inner pressure high for an extended period of time. The cushion includes a protective cushion element and outer shell fabrics superposed on both outer surfaces of the protective cushion element. The cushion element includes a cabin-side base fabric and a window-side base fabric that are sewn together by sewing yarns after bonded to each other by adhesive. The outer shell fabrics are bonded to the protective cushion element by adhesive. The adhesive is applied to the outer surfaces of the protective cushion element the joint wherein the base fabrics are sewn together.

15 Claims, 12 Drawing Sheets

PRIOR ART

FIG. 6(b)

PRIOR ART

FIG. 6(c)

PRIOR ART

CUSHION FOR PROTECTION OF A VEHICLE OCCUPANT'S HEAD

BACKGROUND

The present invention relates to a protective cushion for protection of a vehicle occupant's head. More particularly, the present invention relates to a cushion which is folded and disposed along an upper corner of a side of a vehicle cabin in the normal state and is inflated into a curtain shape to expand over windows of side doors and a B-pillar in the event of a side impact collision or roll-over of the vehicle.

One embodiment of a protective cushion for protection of occupant's head, is a curtain airbag which is folded and disposed along an upper corner of a side of a vehicle cabin in the normal state (i.e., when a vehicle is not in the emergency situation such as the event of a vehicle collision). The airbag inflates into a curtain shape to expand over windows of side doors and a B-pillar in the event of a side impact collision or roll-over of a vehicle. The protective cushion may include two base fabrics which are joined together along their peripheries at a line-shaped joint by stitches of sewing yarns to form a chamber between the base fabrics. The chamber is designed to be filled with gas.

Figure 6A:
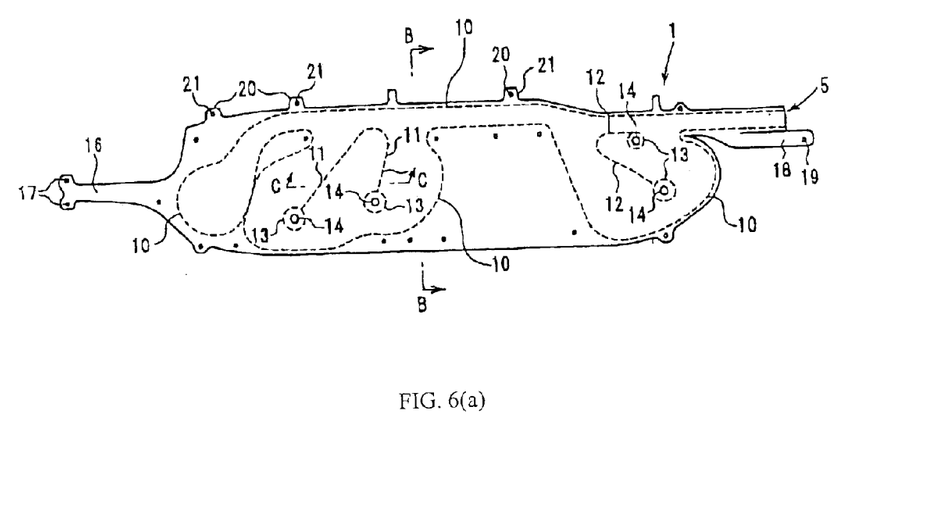
FIG. 6(a) is a front view of a protective cushion 1 for protection of vehicle occupant's head according to a conventional example.
Figure 6B:
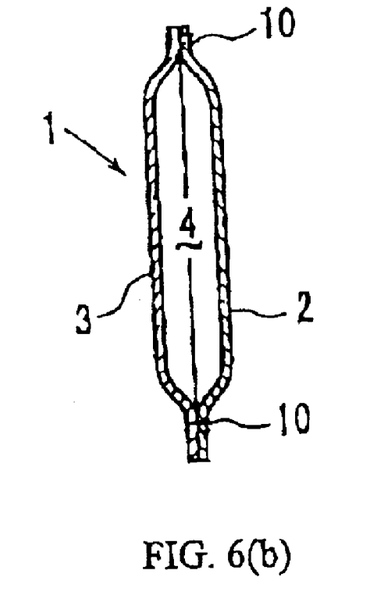
FIG. 6(b) is a sectional view taken along a B—B line of FIG. 6(a)
Figure 6C:
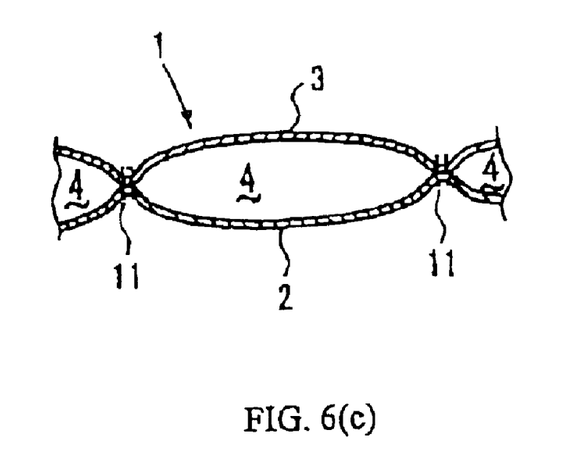
FIG. 6(c) is a sectional view taken along a C—C line of FIG. 6(a).

FIGS. 6(a)–6(c) disclose an exemplary protective cushion or side airbag for protection of a vehicle occupant's head. FIG. 6(a) is a front view of a protective cushion 1 for protection of vehicle occupant's head. FIG. 6(b) is a sectional view taken along a B—B line of FIG. 6(a), and FIG. 6(c) is a sectional view taken along a C—C line of FIG. 6(a).

As shown in FIG. 6(b), the protective cushion 1 includes a cabin-side (i.e. passenger side) base fabric 2 and a window-side base fabric 3 which are superposed and sewn to each other so as to form a chamber 4 between the base fabrics 2 and 3.

The base fabrics 2, 3 are joined to each other along a joint 10 extending around the peripheries of the fabrics. As shown in FIG. 6(a), the joint 10 may extend inward from the edge of the fabric. The curtain may also include joints 11, 12 for subdividing the chamber 4, and circular joints 13 for reinforcing areas around ends of the line-shaped joints 11, 12. Each of the circular joints 13 may include a circular opening 14 formed at the center thereof by cutting out the base fabrics 2, 3.

The cushion 1 extends along the side of the vehicle cabin in the longitudinal direction of the vehicle. The cushion 1 is provided at the front end and the rear end in the longitudinal direction thereof with projecting portions 16, 18 which are formed with holes 17, 19 to facilitate installation of the cushion to the vehicle body. The cushion 1 is provided along the upper edge thereof with a plurality of projections 20 which are also formed with holes 21 to facilitate connection of the cushion 1 to the vehicle body.

A gas inlet 5 through which gas from an inflator (not shown) is introduced is formed at the front end or the rear end (see FIG. 6(a)) of the cushion 1. It should be understood that the position of the gas inlet 5 is not limited thereto and the inflator may be disposed inside the cushion.

The line-shaped joint 11 is apart from the line-shaped joint 10 extending along the cushion. Each end of the line-shaped joint 11 are respectively connected to the circular joints 13.

The upper and lower ends of the line-shaped joint 12 both are apart from the line-shaped joint 10 extending along the upper edge and the lower edge of the cushion and both are connected to the circular joints 13, respectively. The line-shaped joints 11, 12 limit the thickness of the inflated chamber 4. The circular joints 13 reinforce the ends of the line-shaped joints 11, 12.

The cushion 1 may be installed so that the projecting portion 16 at the front end is fixed to an A-pillar of the vehicle by bolts or rivets through the holes 17 thereof. The projecting portion 18 at the rear end may be fixed to a C-pillar by a bolt or rivet through the hole 19 thereof, and the projections 20 along the upper edge may be fixed to a roof side rail by bolts or rivets through the holes 21 thereof. Prior to deployment, the cushion 1 is stored in a folded condition along the upper corner of the vehicle side surface along the roof side rail. The folded cushion 1 may be covered by a cover (not shown). The cover is adapted to be torn or opened when the cushion 1 is inflated.

When the vehicle suffers a side impact collision or roll-over, the inflator (not shown) is actuated, gas flows into the chamber 4 through the gas inlet 5 so that the cushion 1 is inflated and deployed downwardly along the side surface of the vehicle cabin into the curtain shape, thereby protecting the head of occupant.

It is preferable to maintain the head protecting cushion in the inflated state for a period of time (at least several seconds) after inflation not only for prevention of collision of the occupant's head to the window glass or the B-pillar at the instant of the side impact collision of the vehicle but also for protection of the occupant just after the roll-over of the vehicle.

When the protective cushion for protection of vehicle occupant's head is inflated over the window glasses, there is possibility that the cushion may be damaged by fragments of window glasses broken by a vehicle collision or roll-over thereby causing the inner pressure of the cushion to be reduced. Therefore, it is preferable that the protective cushion is provided with measures for coping with this.

Japanese Unexamined Patent Publication No. 11-310097 (incorporated by reference herein) discloses a cushion with dual structure comprising a protective cushion for protection of vehicle occupant's head and an outer cushion in which the protective cushion is accommodated.

As explained concretely, the cushion of the above publication includes a dual structure constituted of an outer cushion made of a woven fabric and an airtight inner cushion both having nearly the same shape when inflated. The outer cushion and the inner cushion are not bonded to each other.

However, since the outer cushion and the inner cushion are not bonded to each other at all, the outer cushion may not follow the movement of inflation of the inner cushion and may sometimes disturb the inflation of the inner cushion. Thus, there remains a need to provide a cushion for protecting a vehicle occupant's head that includes increased resistance to damage.

SUMMARY OF THE INVENTION

One object of the present invention to provide a protective cushion for protection of a vehicle occupant's head. The cushion includes base fabrics that are protected from fragments of window glasses and inflate smoothly. The base fabrics are sewn together with sewing yarns so as to provide minimal gas leakage so as to maintain the inner pressure high for an extended period of time.

According to an embodiment of the present invention, a protective cushion for protection of vehicle occupant's head is provided. The upper portion of the cushion is fixed to the vehicle near the corner between a ceiling and a side surface of the vehicle cabin. The cushion is configured to be inflated by gas and deploy downwardly along the side surface of the cabin. The protective cushion comprises a cabin-side base fabric and a window-side base fabric which are sewn together by sewing yarns. The cushion further includes outer shell fabrics that are superposed on outer surfaces of the cabin-side base fabric and the window-side base fabric, respectively. The outer shell fabrics are bonded by adhesive to at least one of sewn portions formed with sewing yarns for joining the cabin-side base fabric and the window-side base fabric.

According to the aforementioned embodiment of the present invention, outer shell fabrics securely follow the movement of inflation of the cushion element because the outer shell fabrics are bonded to the cabin-side base fabric and the window-side base fabric along the sewn portions by the adhesive. As a result, the cushion inflates and deploys smoothly.

The likelihood of the inflated protective cushion being damaged by fragments of window glasses is reduced because the cabin-side base fabric and the window-side base fabric are shielded by the outer shell fabrics. The outer shell fabrics are bonded via the adhesive to the sewn portions joining the cabin-side base fabric and the window-side base fabric. Because of the sealing efficiency of the adhesive, the gas leakage through the sewn portions is also reduced.

According to the present invention, it is preferable that the cabin-side base fabric and the window-side base fabric are sewn together at least along their peripheries, and the outer shell fabrics are bonded by adhesive to the sewn portion along the peripheries. Since the peripheries of the outer shell fabrics are bonded to the cabin-side base fabric and the window-side base fabric, the outer shell fabrics securely follow the movement of inflation of the cushion composed of the cabin-side base fabric and the window-side base fabric. In addition, this arrangement facilitates the folding of the protective cushion in the state that the outer shell fabrics, the cabin-side base fabric, and the window-side base fabric are superposed on each other.

According to the present invention, the cabin-side base fabric and the window-side base fabric are bonded together by adhesive at portions to be sewn and then sewn together at the portions by the sewing yarns. According to this arrangement, the gas sealing property at the sewn portions is further improved.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 2(a), 2(b) are sectional views taken along a line II—II of FIG. 1(b) wherein FIG. 2(a) shows the non-inflated state and FIG. 2(b) shows the inflated state.

DETAILED DESCRIPTION

Figure 1A:
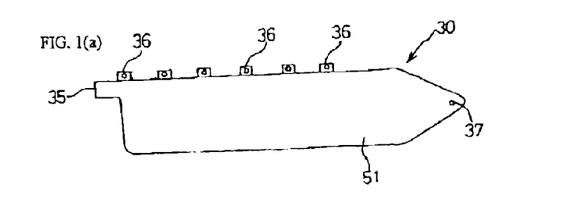
FIG. 1(a) is a side view of a protective cushion for protection of vehicle occupant's head according to an embodiment of the present invention.
Figure 1B:
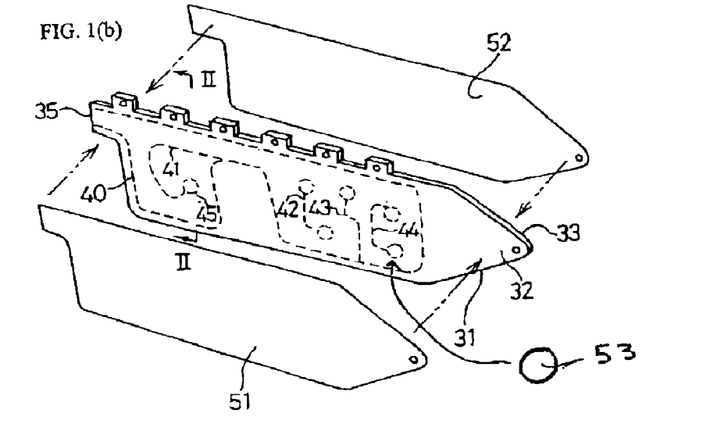
FIG. 1(b) is an exploded perspective view of the cushion of FIG. 1(a)
Figure 1C:
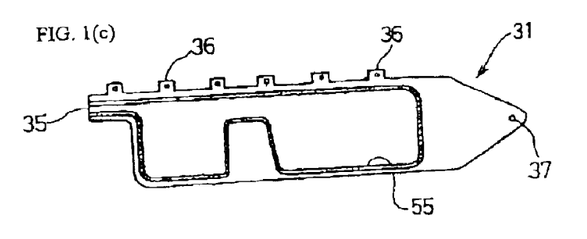
FIG. 1(c) is a view of one panel of the cushion showing an application of a portion of adhesive.
Figure 2A:
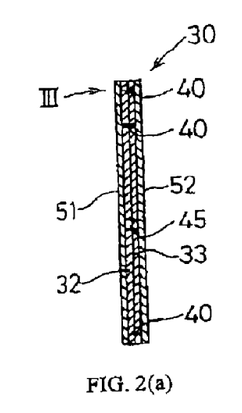
Figure 2B:
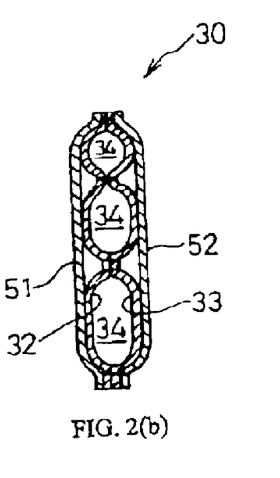

Hereinafter, embodiments of the present invention will be described with reference to the attached drawings. As shown in FIG. 1(b), a protective cushion 30 for protection of vehicle occupant's head according to the embodiment comprises a protective cushion element 31 and outer shell fabrics 51, 52 superposed on the both side surfaces of the protective cushion element 31.

According to this embodiment of the present invention, the protective cushion element 31 comprises a cabin-side base fabric 32 and a window-side base fabric 33 which are sewn together by sewing yarns to form a chamber 34 between the base fabrics 32 and 33. The base fabrics 32, 33 are joined together at joints formed with sewing yarns. The connecting joints include a line-shaped joint 40 extending around the peripheries of the fabrics 32, 33 (with some parts thereof extending inward of the base fabrics 32, 33), and additional line-shaped joints 41, 42, 43, 44 for subdividing the chamber 34. Circular joints 45 are provided for reinforcing areas around ends of the line-shaped joints 41–44. According to the present invention, the cabin-side base fabric 32 and the window-side base fabric 33 are bonded to each other by adhesive 39 and, after that, are sewn together by sewing yarns. The protective cushion element 31 is provided at the rear end thereof with a gas inlet 35 for introduction of gas from an inflator (not shown).

The protective cushion element 31 is provided along the upper edge thereof with a plurality of projections 36 for installation of the protective cushion 30 to a vehicle body such as a roof side rail. Each projection 36 may include a hole for insertion of a connecting bolt. The protective cushion element 31 is provided at the front end thereof with holes 37 for installation to an A-pillar.

The outer shell fabrics 51, 52 are preferably formed in a shape corresponding to the shape of the cabin-side base fabric 32 and the window-side base fabric 33 (except for the projections 36). It should be noted that the outer shell fabrics 51, 52 may have any shape capable of substantially entirely covering the inflatable portions of the protective cushion element 31. The outer shell fabrics 51, 52 may be made of the same fabric of the protective cushion element 31 and is preferably made of relatively thin fabric (e.g., 70–210 deniers) in order to reduce the volume of the folded fabrics as small as possible. In addition, it is preferable that at least one of the surfaces of each outer fabric 51, 52 is coated by silicone resin or the like.

Figure 3:
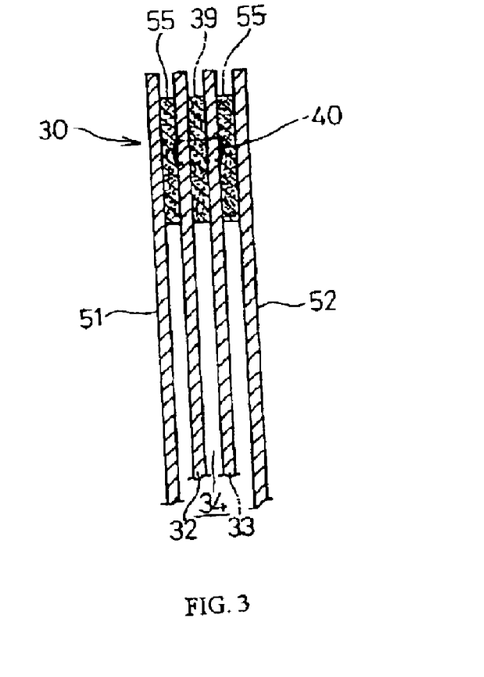
FIG. 3 is an enlarged view of a portion III of FIG. 2(a).

The outer shell fabrics 51, 52 are bonded to the protective cushion element 31 by adhesive 55. According to an embodiment of the present invention, the adhesive 55 is applied to the outer surface of the protective cushion element 31 in a narrow band along a line corresponding to the joint 40 along the peripheral edge of the base fabrics 32, 33. The adhesive 55 covers the joint 40. As shown in FIG. 3, silicone resin adhesive made of the same material as the adhesive 39 used for the line-shaped joint 40 may be used for the adhesive 55.

The protective cushion 30 for protection of vehicle occupant's head is fixed to the vehicle body in the folded state using fasteners that pass through the holes of the projections 36 and the hole 37 at the front end. The protective cushion 30 for protection of vehicle occupant's head may be covered by a cover (not shown). The cover is adapted to be torn or opened when the protective cushion 30 is inflated. The cover may be form an integral part of the interior roof of the vehicle.

When the vehicle suffers a side impact collision or rollover, the inflator is actuated and gas flows into the chamber 34 through the gas inlet 35 so that the cushion 30 is inflated and deployed downwardly along the side surface of the vehicle cabin, thereby protecting the head of the occupant. During the deployment of the cushion the inner pressure of the chamber 34 increases because of the inflation with gas and plunge of the head of the occupant. As a result, extremely large stress may be concentrated on the line-shaped joints 40–44 and the circular joints 45 which are formed by adhesive and sewing.

Since the outer shell fabrics 51, 52 are bonded to the protective cushion element 31 along the line-shaped joint 40 by the adhesive 55, the outer shell fabrics 51, 52 follow the movement of inflation of the protective cushion element 31 so as to deploy smoothly, whereby the protective cushion 30 can be smoothly inflated as a whole.

Since the adhesive 55 is applied to portions along the line-shaped joint 40 of the protective cushion element 31 which is formed by sewing, needle holes which were formed in the surfaces of the protective cushion element 31 during the sewing process for the line-shaped joints of the protective cushion element 31 are filled with the adhesive 55 and are covered by the outer shell fabrics 51, 52, thereby minimizing the gas leakage through the portions.

The inflated protective cushion element 31 of the protective cushion 30 for protection of vehicle occupant's head is prevented from being damaged by fragments of window glasses because the cushion element 31 is shielded by the outer shell fabrics 51, 52. Even when the adhesives 39 are detached or flocculated and broken due to the strong expanding pressure and the stress concentration, the sewing yarn of the line-shaped joint 40 is covered by the adhesive 55 on the outer surface, thereby reducing the likelihood of any gas leakage.

Figure 4:
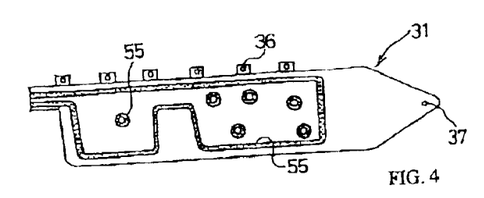
FIG. 4 is an illustration for explaining another embodiment.

Though the adhesive 55 is only applied to the portions along the line-shaped joint 40 in the aforementioned embodiment, the adhesive 55 may also be applied to portions corresponding to the circular joints 45, as shown in FIG. 4, so as to join the protective cushion element 31 and the outer shell fabrics 51, 52 at these portions. In addition, the adhesive 55 may also be applied to portions corresponding to the line-shaped joints 41, 42, 43, 44 so as to join the protective cushion element 31 and the outer shell fabrics 51, 52. In this manner, the integrity of the outer shell fabrics 51, 52 and the protective cushion element 31 is improved, thereby facilitating the folding of the protective cushion 30 for protection of vehicle occupant's head and preventing gas leakage through the seams formed by sewing the circular joints 45.

Though the outer shell fabrics 51, 52 have no projection in the aforementioned embodiment, the outer shell fabrics 51, 52 may have projections to be superposed on the projections 36.

Figure 5A:
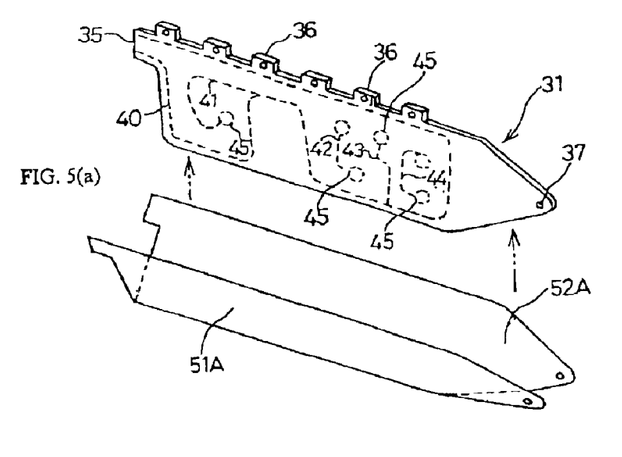
FIG. 5(a) is an exploded perspective view of a cushion according to another embodiment of the present invention.
Figure 5B:
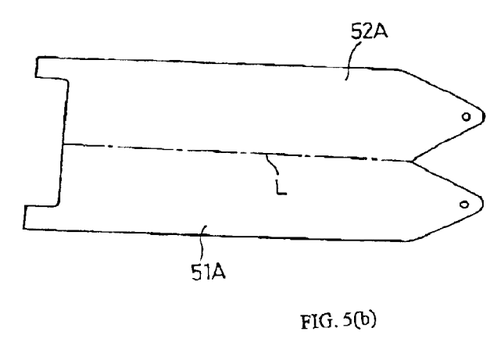
FIG. 5(b) is a view of the fabric panels of the cushion shown in FIG. 5(a).

Though the outer shell fabrics 51, 52 are separated pieces in the aforementioned embodiment, the outer shell fabrics may be outer shell fabrics 51A, 52A composed of one continuous piece as shown in FIGS. 5(*a*), 5(*b*). The piece for the outer shell fabrics 51A, 52A may be folded double along the center line L and is superposed on and bonded to the protective cushion element 31 by the adhesive as shown in FIG. 5(*a*).

According to an embodiment of the present invention, (as shown in FIG. 1(*b*)) cloth patches 53 may be attached to the protective cushion element 31 so that the cloth patches 53 are superposed on the circular joints 45. According to this exemplary embodiment of the present invention, the circular joints 45 are reinforced and gas leakage through the circular joints 45 is minimized by the cloth patches. Cloth patches 53 may be employed as an alternative to bonding the outer shell fabrics 51, 52 to the circular joints 45 by the adhesive 55. The cloth patches 53 may comprise the same material and may be attached in the same manner as the outer shell fabrics 51, 52, as described above.

It should be understood that the present invention is not limited to the illustrated embodiments and may take another configuration than the illustrated ones.

As described above, the present invention can provide a protective cushion for head protection which can be sufficiently prevented from gas leakage so as to maintain the inner pressure high over a lengthy period in time and, in addition, can be smoothly inflated and deployed.

The priority application, Japanese Patent Application No. 2001-261706 filed Aug. 30, 2001, is hereby incorporated by reference herein in its entirety.

Given the disclosure of the present invention, one versed in the art would appreciate that there may be other embodiments and modifications within the scope and spirit of the invention. For example, in one embodiment of the present invention the outer shell fabric may only be place on the side of the cushion facing the window. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cushion configured to inflate downwardly along a side surface of a vehicle for protecting a vehicle occupant's head comprising:
    a cabin-side base fabric and a window-side base fabric sewn together along a seam to enclose an inflatable chamber;
    an outer shell fabric superposed on outer surfaces of the cabin-side base fabric and the window-side base fabric; and
    wherein the outer shell fabric is bonded to the base fabrics at the seam by adhesive.

2. The cushion for protecting a vehicle occupant's head of claim 1, wherein the seam where the cabin-side base fabric and the window-side base fabric are sewn together is located along the periphery of the base fabrics.

3. The cushion for protecting a vehicle occupant's head of claim 1, wherein the cabin-side base fabric and the window-side base fabric are bonded together by adhesive along the seam.

4. The cushion for protecting a vehicle occupant's head of claim 1, wherein the outer shell fabric comprises two separate pieces of fabric, one of the separate pieces of fabric being superposed on the outer surface of the cabin-side base fabric and the other of the separate pieces of fabric being superposed on the outer surface of the window-side base fabric.

5. A side airbag for protecting a vehicle passenger comprising:
an inflatable cushion comprising a window side sheet and a passenger side sheet, wherein the sheets are sewn together along a seam to enclose an inflatable chamber;
a layer of fabric attached to an exterior surface of the passenger side sheet by adhesive, wherein the adhesive is located between the layer of fabric and the passenger side sheet along the seam,
wherein the seam does not pass through the layer of fabric.

6. The side airbag of claim 5, wherein the shape of the fabric layer corresponds substantially to the shape of the passenger side sheet.

7. A side airbag for protecting a vehicle passenger comprising:
an inflatable cushion comprising a window side sheet and a passenger side sheet, wherein the sheets are sewn together along a seam;
a layer of fabric attached to an exterior surface of the passenger side sheet by adhesive, wherein the adhesive is located between the layer of fabric and the passenger side sheet along the seam.
wherein the seam does not pass through the layer of fabric, and wherein the seam is located along a periphery of the window side sheet and the passenger side sheet; and wherein the sheets are further connected by interior seams that divide a gas containing chamber located between the sheets.

8. The side airbag of claim 7, wherein the fabric layer comprises cloth patches that cover the interior seams.

9. A cushion for protecting the head of a vehicle passenger comprising:
a window side sheet and a passenger side sheet, wherein the sheets are sewn together along a peripheral seam located along a periphery of the window side sheet and the passenger side sheet; and wherein the sheets are further connected by interior seams that divide a gas containing chamber located between the sheets;
a layer of fabric attached to the exterior of the window side sheet and the passenger side sheet by adhesive, wherein the adhesive is located between the layer of fabric and the sheets along the peripheral seam; and wherein the shape of the fabric layer corresponds substantially to the shape of the sheets,
wherein the peripheral seam does not pass through the layer of fabric.

10. The cushion of claim 9, further comprising a second adhesive connecting the layer of fabric to the sheets at the interior seams.

11. The cushion of claim 9, wherein the layer of fabric comprises a first layer of fabric connected to the window-side sheet and a second layer of fabric connected to the passenger side sheet.

12. A side airbag for protecting a vehicle passenger comprising:
an inflatable cushion comprising a window side sheet and a passenger side sheet, wherein the sheets are sewn together along a seam to enclose an inflatable chamber;
a layer of fabric attached to an exterior surface of the window side sheet by adhesive, wherein the adhesive is located between the layer of fabric and the window side sheet along the seam,
wherein the seam does not pass through the layer of fabric.

13. The side airbag of claim 12, wherein the shape of the fabric layer corresponds substantially to the shape of the window side sheet.

14. A side airbag for protecting a vehicle passenger comprising:
an inflatable cushion comprising a window side sheet and a passenger side sheet, wherein the sheets are sewn together along a seam;
a layer of fabric attached to an exterior surface of the window side sheet by adhesive, wherein the adhesive is located between the layer of fabric and the window side sheet along the seam,
wherein the seam does not pass through the layer of fabric, and wherein the seam is located along a periphery of the window side sheet and the passenger side sheet; and wherein the sheets are further connected by interior seams that divide a gas containing chamber located between the sheets.

15. The side airbag of claim 14, wherein the fabric layer comprises cloth patches that cover the interior seams.

* * * * *